United States Patent [19]
Verne

[11] Patent Number: 4,807,662
[45] Date of Patent: Feb. 28, 1989

[54] VALVE FOR DISTRIBUTING PARTICULATE MATERIALS

[75] Inventor: Jean A. Verne, Manitoba, Canada

[73] Assignee: Sullivan Strong Scott Ltd., Winnipeg, Canada

[21] Appl. No.: 75,764

[22] Filed: Jul. 20, 1987

[51] Int. Cl.$^4$ ............................................. F16K 37/00
[52] U.S. Cl. ............................... 137/554; 137/625.11; 137/874; 251/129.12
[58] Field of Search .............. 137/554, 625.11, 625.46, 137/874, 876; 251/129.11, 129.12, 129.13

[56] References Cited

U.S. PATENT DOCUMENTS

| | | | |
|---|---|---|---|
| 4,130,030 | 12/1978 | Stratienko | 251/129.11 X |
| 4,291,724 | 9/1981 | Miller | 137/874 X |
| 4,299,251 | 11/1981 | Dugas | 137/554 X |
| 4,310,022 | 1/1982 | Cohen | 137/625.11 X |
| 4,366,839 | 1/1983 | Slavin | 137/625.11 |
| 4,619,562 | 10/1986 | Brannstrom | 137/874 |

FOREIGN PATENT DOCUMENTS

| | | | |
|---|---|---|---|
| 1082783 | 6/1960 | Fed. Rep. of Germany | 137/874 |
| 3319273 | 12/1983 | Fed. Rep. of Germany | 137/874 |
| 0084283 | 5/1983 | Japan | 137/554 |

Primary Examiner—John Rivell

[57] ABSTRACT

A valve system for distributing particulate materials includes a housing with a number of outlets. A distributor is rotated inside the housing by motor so that its outlet registers in succession with each housing outlet. A position sensor detects registration of the distributor outlet with each housing outlet and comprises a set of spaced-apart optical transmitters, a corresponding set of optical detectors and an encoding disk mounted for rotation between the transmitters and detectors. The encoding disk has a number of circumferentially spaced transmission zones, one corresponding to each housing outlet. Each transmission zone has apertures adapted to place a unique set of the transmitters and detectors in communication thereby causing the detectors to generate a unique signal. The encoding disk is rotated such that a particular transmission zone registers between the transmitters and detectors whenever the distributor outlet registers with the corresponding housing outlet. Controls permit an operator to enter a code specifying a particular housing outlet and stop rotation of the distributor when registered with the selected outlet. The controls also comprise a programmable memory unit which permits the each housing outlet, and consequently a bin or vehicle to be filled, to be identified with any desired code.

19 Claims, 3 Drawing Sheets

VALVE FOR DISTRIBUTING PARTICULATE MATERIALS

FIELD OF THE INVENTION

The invention relates to devices for directing the flow of particulate materials, such devices being referred to in the present specification as "valves". For purposes of the invention, such particulate materials may consist of fine comparatively regular granules or very large irregular materials.

DESCRIPTION OF THE PRIOR ART

The invention has specific, though not exclusive, application to the distribution of grains. Valves used for such purposes commonly comprise a distributor which receives and dispenses the grain and which is rotated by an electric motor successively into registration with a number of outlets. The outlets may lead to different storage bins or to a vehicle suitable for bulk transport.

It is an important feature of any such particle valve to be able to register the distributor selectively with any particular outlet. It has been common practice to do so by using a multiplicity of mechanical trip switches. Basically, power to the motor driving the distributor is discontinued when a microswitch or the like is mechanically tripped. A problem inherent in such arrangements is that a mechanical trip switches can be easily fouled by the particulate materials being delivered.

Another significant aspect regarding control of such a particle valve relates to specification of the outlet to be used for discharge. In an existing plant, it is quite possible that various storage bins and delivery shutes coupled to the valve will have certain identifying codes with which operators are very familiar. Any valve control system should preferably be sufficiently flexible as to accommodate any existing identification scheme, permitting an operator to specify which valve outlet is to be used with familiar codes. Also, it would be desirable for any valve control system to accommodate conveniently any expansion in the number of bins or shutes to be serviced, without requiring operators to revise the entirety of their coding arrangement and requiring extensive re-learning of such coding arrangements.

SUMMARY OF THE INVENTION

In one aspect, the invention provides a valve system for distributing particulate material, including a housing defining a plurality of outlets and a distributor which has an inlet for receiving the particulate materials and a discharge outlet. The distributor is so mounted to the housing that the distributor outlet can be moved into registration with any one of the housing outlets, and drive means are provided for moving the distributor outlet into registration with each of the housing outlets, preferably in some predetermined order. Position sensing means are provided which sense the position of the distributor outlet relative to the housing outlets, the position sensing means including transmission means for transmitting a signal, detection means for detecting the transmitted signal and transmission varying means for so varying the transmission path between the transmission means and the detection means in response to movement of the discharge outlet that the transmitted signal is encoded to identify registration of the distributor outlet with each of the housing outlets. Selection means are provided to permit an operator to select a housing outlet with respect to which the distributor is to be registered, and control means respond to the selection means and to the detection means to stop movement of the distributor when the distributor outlet is registered with the selected housing outlet.

Various inventive features which associated with such a device will be described in greater detail below in connection with the description of a preferred embodiment and will be more specifically defined in the appended claims.

DESCRIPTION OF THE DRAWINGS

The invention will be better understood with reference to the drawings in which.

DESCRIPTION OF PREFERRED EMBODIMENT

Figure 1:
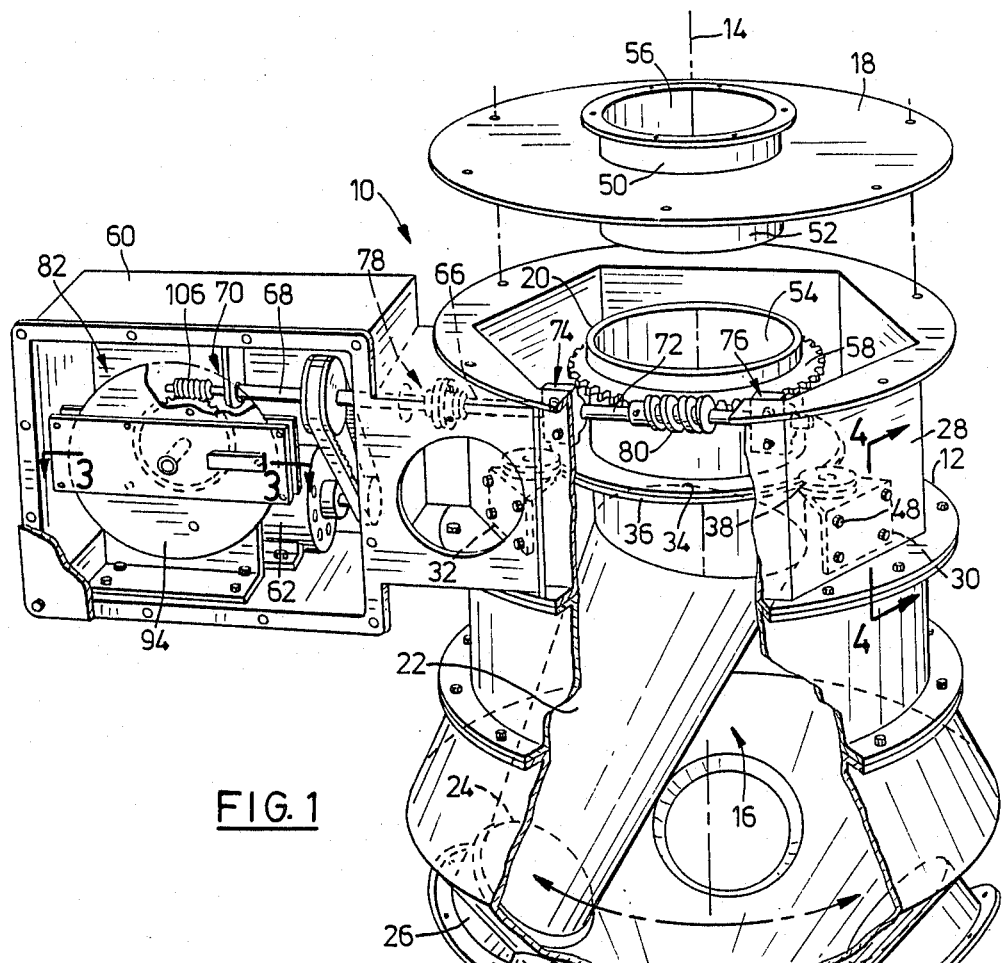
FIG. 1 is a fragmented perspective view of a valve system including a valve housing and a rotating distributor.
Figure 2:
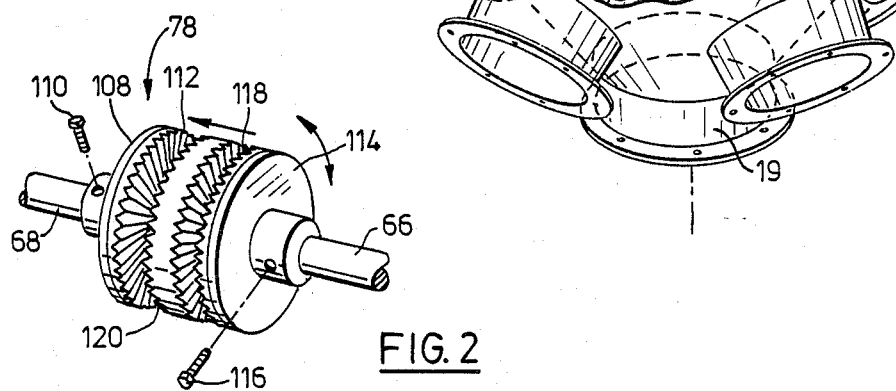
FIG. 2 is a fragmented perspective view detailing a coupling in the drive train between an electric motor and the distributor.

Reference is made to FIG. 1 which illustrates a preferred embodiment of a particle distributing valve 10. The valve 10 comprises a steel housing 12 which is in large measure radially symmetric about a central housing axis 14, this axis also constituting the rotational axis of a distributor 16 mounted in the interior of the valve housing. The valve housing 12 has an upper end which is closed with a removable cap 18 through which particulate materials can be introduced and has a lower end which defines an open overflow outlet 19. Intermediate the upper and lower ends, the housing sidewall has five outlets substantially equally-spaced circumferentially relative to the central housing axis 14. Each outlet is terminated with an apertured flange which permits bolting of the valve housing outlet to a conduit or the like serving to direct particulate materials from the valve 10 to a storage bin or an appropriate transport vehicle.

The distributor 16 has a cylindrical portion 20 centered about the vertical rotational axis 14. The upper end of the cylindrical distributor portion 20 is open to serve as an inlet for receipt of particulate material. The distributor 16 includes a discharge spout 22 formed at the bottom of the cylindrical distributor portion 20 and angled relative to the cylindrical distributor portion 20 and the rotational axis 14. The distributor spout 22 terminates with a discharge outlet 24 which has been shown in FIG. 1 in registration with a particular valve housing outlet 26.

The distributor 16 is mounted from inner surfaces of an upper housing section 28 for rotation about the axis 14. The mounting means comprise three roller assemblies (only two such assemblies 30, 32 apparent in FIG. 1) equally-spaced circumferentially about the cylindrical distributor portion 20 and the rotational axis 14.

These roller assemblies engage a circular flange 34 formed about the cylindrical distributor portion 20 and having a generally circular periphery 36.

Figure 3:
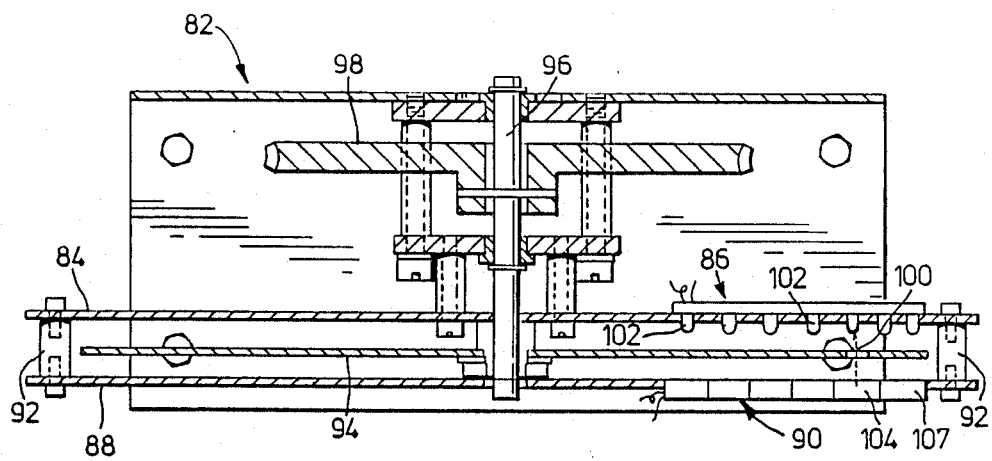
FIG. 3 is a cross-sectional view along the lines 3—3 of FIG. 1 detailing a position sensor used to detect the position of the distributor relative to certain outlets associated with the valve housing.
Figure 4:
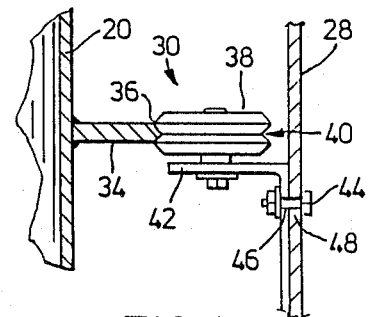
FIG. 4 is a cross-sectional view along the lines 4—4 of FIG. 1 detailing a roller assembly used to rotatably support the distributor.

The roller assembly 30 is shown in greater detail in FIG. 4. The roller assembly 30 may be seen to comprise a roller 38 with a circular groove 40 having a generally concave V-shaped radial cross-section which conforms to the convex V-shaped radial cross-section of the outer surface of the flange periphery 36. A bracket 42 bolted to an inner housing surface serves to support the roller 38 which is free to rotate about a vertical axis. The bolts securing the bracket 42 (only one bolt 44 specifically indicated) extend through holes (only one hole 46 specifically indicated) formed in the bracket 42 and through horizontal slots formed in the upper housing section 28 (only one slot 48 specifically indicated). This arrangement permits the entire roller assembly 30 to be moved horizontally between a position in which the roller 38 engages the periphery 36 of the flange 34 (as in FIG. 3) and a position (not illustrated) in which the roller 38 is spaced from the flange peripheral 36.

This roller arrangement is particularly significant to proper mounting and suspension of the distributor 16. During installation, the cap 18 is removed from the valve housing 12 and the distributor 16 is then inserted into the housing interior. The periphery 36 of the distributor flange 34 can be properly located between two rollers, but the third roller 38 must be displaced to permit such location. The roller 38 can then be advanced to engage the flange periphery 36 thereby providing proper support for the distributor 16. This arrangement also permits adjustment of the clearance between the rollers and the flange periphery 36 if play for any reason develops during subsequent operation of the valve 10. For purposes of permitting such installation and adjustment, all three roller assemblies may be similarly mounted, but it is only essential that one assembly e displaceably mounted to obtain the benefits of this arrangement.

The cap 18 is adapted to centre the upper end of the distributor 16 properly for rotation about the housing axis 14. To that end, the cap 18 is formed with a downwardly-extending cylindrical sleeve 50 which extends into the cylindrical distributor portion 20 and which has an outer surface 52 conforming in dimension to the inner surface 54 of the cylindrical distributor portion 20. The cap 18 is formed with a vertical passage 56 that permits particulate material to be deposited through the sleeve 50 under gravity into the interior of the distributor 16. The exterior surface of the cylindrical distributor portion 20 carries a toothed worm wheel 58 centered for rotation about the rotational axis 14 by means of which the distributor 16 may be rotated. This arrangement provides a very simple and inexpensive mechanism for properly locating the upper end of the distributor 16 and simultaneously permitting the delivery of materials to the distributor 16 under gravity.

A steel drive housing 60 is mounted to the exterior of the valve housing 12. The drive housing 60 contains an electric motor 62 and means which define two drive trains, as discussed more fully below. The electric motor 62 is coupled by a toothed drive belt 64 and appropriate pulleys (illustrated but not numbered) to a drive shaft 66. The drive shaft 66 has a two-part construction, consisting of a first drive shaft portion 68 bearing mounted in the drive housing 60 at the position 70 and second drive shaft portion 72 which is bearing mounted in the interior of the valve housing 12 at positions 74,76. The two drive shaft portions 66, 68 are joined by a releasable coupling 78 to define a unitary structure during actual operation. A worm gear 80 mounted on the second drive shaft portion 72 in the interior of the valve housing 12 is meshed with the worm wheel 58 formed on the exterior of the distributor 16. These components may be seen to define a first drive train which permits transmission of rotational force or power from the motor 62 to the distributor 16 such that the distributor outlet 24 may be rotated successively into registration with each valve housing outlet.

The drive housing 60 also contains a position sensor 82 which is apparent in the perspective view of FIG. 1 and which is further detailed in the cross-sectional view of FIG. 4. The position sensor 82 may be seen to comprise a circuit board 84 which carries seven spaced-apart light emitting diodes (LED's) which have together been indicated by the reference numeral 86 and which serve as optical signal transmitters. A corresponding circuit board 88 carries seven optical detectors, together indicated by the reference numeral 90, each aligned with and responsive to a different one of the LED's 86. The two circuit boards are separated by a fixed predetermined distance by means of spacers 92 thereby ensuring that the optical signals have a particular intensity at the detectors 90 for purposes of conventional threshold detection. Conventional electronic drive circuitry is provided to illuminate the LED's 86 continuously, and conventional detection circuitry is provided to processes the signals generated by the detectors 90 in response to the LED's 86.

The two circuit boards and the associated LED's 86 and optical detectors 90 are stationary relative to the drive housing 60. A rotatable encoding disk 94 is mounted between the LED's 86 and the optical detectors 90. The encoding disk 94 is fixed to a shaft 96 which is rotatably mounted in the drive housing 60 and which extends perpendicularly through the two circuit boards. A worm wheel 98 is fixed to the shaft 96 for rotation therewith about the shaft's central axis, thereby permitting a rotational force to be applied to the encoder disk 94.

Figure 5:
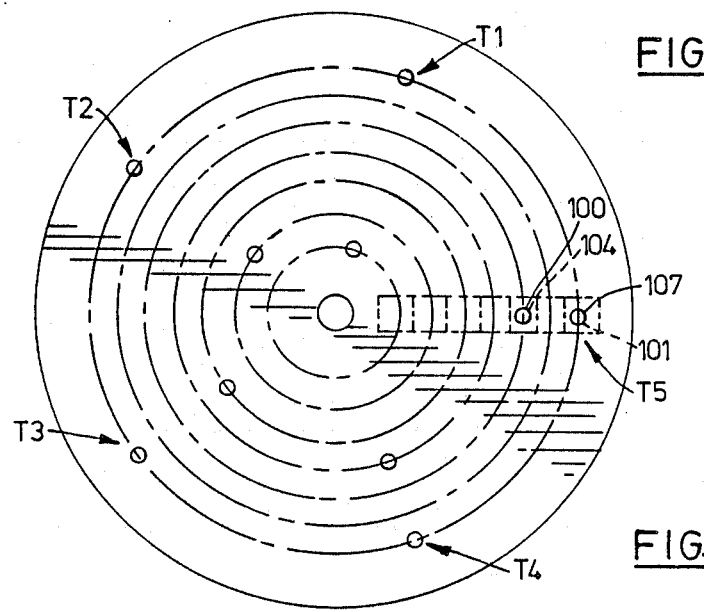
FIG. 5 is a plan view of an encoding disk associated with the valve system.

The encoding disk 94 is generally solid thereby blocking light transmission except at five distinct transmission zones T1–T5 which are equally-spaced circumferentially about the disk 94. As described more fully below, each transmission zone corresponds to a different valve housing outlet. In this particular embodiment of the invention, each transmission zone comprises two apertures, each aperture being positioned on a different one of seven distinct radii relative to the shaft 96 defining seven distinct circles. In each transmission zone, the apertures associated with the six innermost circles serve to uniquely identify the transmission zone. The radially outermost aperture comprised by each transmission zone comprises serves as means for confirming registration of the transmission zone with the transmitters and detectors. For example, as apparent from FIGS. 3 and 5, the aperture 100 of transmission zone T5 is shown registered with a LED 102 (one of the LED's indicated together as 86) and detector 104 (one of the detectors indicated together as 90), defining a transmission path therebetween. The aperture 101 of the transmission zone T5 positioned at the outermost circle is also registered with one LED 105 and a corresponding detector 107. Each transmission zone serves essentialy to couple a unique set of the LED's 86 and detectors 90 when registered.

This arrangement effectively encodes the transmission of light signals generated by the LED's 86 and causes the detectors 90 to generate signals uniquely identifying a registered transmission zone. The apertures on the six innermost circles of each of the transmission zones T1–T5 define or correspond to a unique binary coded signal. The innermost circle corresponds to a value of 1 and the outermost of these six circles corresponds to a value of 32. A unique binary signal is generated by the detectors 90 each time one of the transmission zone registers between the LED's 86 and the detectors 90. The single apertures of the transmission zones T1–T5 lieing on the six innermost circles correspond respectively to the binary representation of the numbers 1, 2, 4, 8 and 16. As will be described more fully below, each of the transmission zone T1–T5 is arranged to correspond to a different valve housing outlet, and the encoded transmission occurring upon registration of each transmission zone between the LED's 86 and the optical detectors 90 serves to uniquely identify registration of the distributor outlet 24 with a corresponding one of the housing outlets.

The encoding disk 94 is rotated by the motor 62 at the same angular velocity as is the distributor 16. To that end, a worm gear 106 is mounted on the first drive shaft portion 68 in the interior of the drive housing 60 and is meshed with the worm wheel 98 associated with the encoding disk 94. This completes a second drive train, extending between the motor 62 and the encoding disk 94. The gear ratio between the worm gear 80 and the distributor worm wheel 58 is identical to the gear ratio between the worm gear 106 and the worm wheel 98 associated with the encoding disk 94. Registration of any transmission zone between the LED's 86 and optical detectors 90 can consequently be timed to correspond in an absolute sense to the registration of the distributor outlet 24 with any particular valve housing outlet. This provides a very simple and reliable mechanism for detecting the position of the distributor outlet 24 relative to the valve housing outlet.

The coupling 78 located in the drive train between the motor 62 and the distributor 16 is adapted to permit incremental adjustment in the timing of the registration of the transmission zones T1–T5 between the LED's 86 and detectors 90 relative to the registration of the distributor outlet 24 with each valve housing outlet. To that end, the coupling 78 includes a first coupling member 108 fixed by a set screw 110 to the first drive shaft portion 68 and having a circular gear track 112 composed of uniformly-spaced teeth. A second coupling member 114 is similarly fixed by a set screw 116 to the second drive shaft portion 72 and is similarly formed with a circular gear track 118, this gear track having uniformly spaced teeth similar to those of the first gear track 112. A neoprene spacer 120 of generally circular shape and formed on opposing sides with toothed gear tracks complementary to those of the parts 108, 114 is interposed between the two drive members to provide a measure of elasticity in the connection that accommodates any play between the two members and any jarring effect upon start-up of the motor 62.

To adjust registration, the set screws 110, 116 associated with the coupling 78 are released to permit axial separation of the coupling members 108, 114. The first drive shaft portion 68 may be rotated either before or after this initial step until one transmission zone is properly registered between the LED's 86 and the detectors 90. The second drive shaft portion 72 may then be independently rotated until the discharge outlet 24 of the distributor 16 is properly registered with a particular valve housing outlet to be associated with the particular transmission zone. The second shaft portion 72 is preferably extended sufficiently to permit attachment of a hand wheel (not illustrated) to facilitate rotation of the distributor 16. Once the simultaneous registration of the transmission zone between the LED's 86 and the optical detectors 90 and the registration of the distributor outlet 24 with the particular valve housing outlet has been arranged, the toothed tracks of the two drive shaft members 108, 114 may be re-engaged via the neoprene spacer 120, and the set screws 110, 116 tightened to secure the connection.

Figure 6:
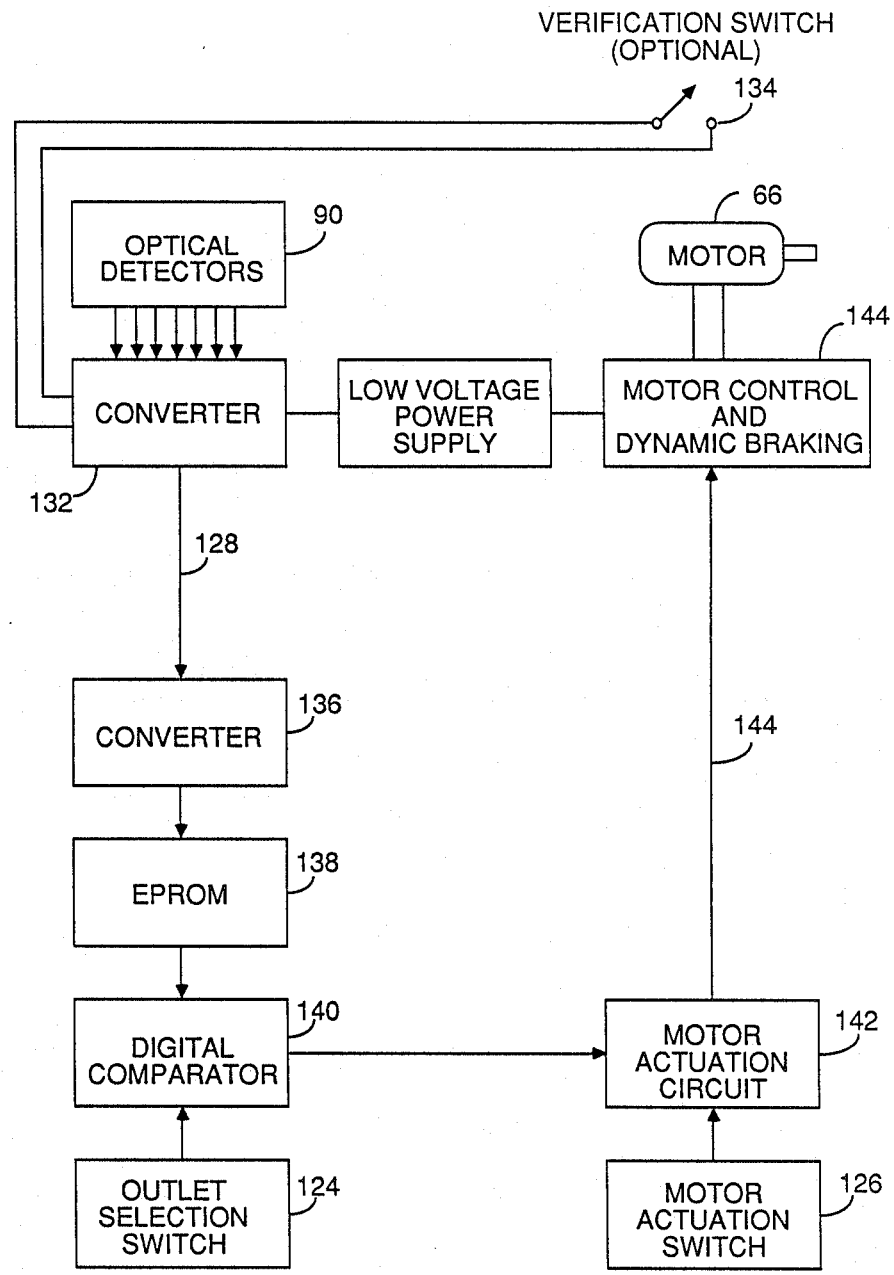
FIG. 6 diagrammatically illustrates control circuitry associated with the valve system.

FIG. 6 diagrammatically illustrates control and selection circuitry associated with the valve system. This circuitry includes the board 84 which carries the LED's and the optical detector board 88. Controls remote from the valve 10 permits an operator to control the system at a console remote from the valve 10 itself. The remotely-located control circuit includes a digital selection switch 124 that permits an operator to select a valve housing and which generates a corresponding digital selection code. It also includes a motor actuation switch 126 which permits an operator once he has made his selection to generate a signal triggering rotation of the distributor to the selected housing outlet. The selection switch preferably includes a digital display unit which indicates the actual position of the distributor relative to the housing outlets and which also indicates the required position of the distributor.

Two serial data transmission lines are provided for transmission of data between the valve 10 and the remotely-located control circuitry. A two-wire distributor position line 128 serves to transmit data bits identifying the current position of the distributor 16. A motor control line 130 serves to transmit motor control signals such as a motor start signal and a motor halt signal generated at the control console.

The output signals of the optical detectors 90 are received in parallel by a digital serializer 132 which essentially converts the detector signals a single stream of data bits. Seven data lines are shown in FIG. 6 coupling the optical detectors to the serializer 132. Six of the data lines correspond to the six infrared emitters and detectors lieing at the six innermost radii associated with the encoding disk 94. The seventh line corresponds to the outermost ring of apertures associated with the various transmission zones and essentially transmits an enable signal when the LED's and detectors 90 are registered. This enables signal confirms that registration of a transmission zone with the LED's and detectors 90 has occured and confirms that data regarding registration are reliable.

There is an eighth bit which is optionally generated in response to an optional verification switch 134 provided for purposes of weigh scale verification as required by some regulatory agencies. The verification switch 134 is a manual switch tripped when the distributor aligns with a particular housing outlet and provides an absolute signal indicating such registration. Such alignment may be separately indicated on any display associated with the control console.

The eight bits of data are transmitted as two serial signals, one corresponding to the four lower order position bits, the other corresponding the two higher order position bits together with the seventh registration verification bit and the eighth optical verification bit. The serializer 132 embeds error checking signals in a standard fashion in each of the two serial data signal. To further enhance noise rejection, the bits of the two data streams may be duplicated and separated by a marker so that absence of bit pairs will provide a further indication of transmission error. These serial streams of data are transmitted along two distinct wires associated with distributor position line 128 to the control console where they are received by a converter 136.

The converter 136 converts the serial data bits to a parallel format. The converter 136 is also adapted to perform a check of the incoming bit stream based on the associated error checking signals which are transmitted therewith and also based on the requirement for paired bits and the seventh verification bit. If an error is detected, the transmitted data is rejected and the distributor continues to rotate even if it has approached the selected position.

Assuming that the data bits received along the distributor position line 128 are free of transmission errors, the converter 136 applies the first six bits which identify the position of the distributor to an erasable programmable read-only memory (EPROM) unit 138. The EPROM unit 138 is addressable in a conventional manner and treats the BCD signal identified by the six position bits as an address signal for memory locations in the unit 138. The EPROM unit 138 consequently retrieves or outputs the data stored at the identified memory location, namely, a pre-programmed housing outlet identification code.

The EPROM unit 138 will normally be programmed to associate each BCD signal generated by registration of the optical transmitters 86 and detectors 90 with one of the valve housing outlets and a corresponding receptacle to be filled. The use of such a memory unit provides considerable flexibility in the installation of such a valve system in existing distribution system: the control circuitry may be readily programmed to relate the standard binary position signals associated with an ecoding plate appropriate for the number of housing outlets to an already existing numbering or identification system in use at a particular installation.

A digital comparator 140 compares the valve outlet code generated by the EPROM unit 138 with the outlet selection code generated by the outlet selection switch 124. If the two codes correspond, the digital comparator 140 applies a shut off signal to a motor actuation circuit 142. The motor actuation circuit 142 then transmits a corresponding shut off signal to motor control and dynamic braking circuitry 144.

The motor control and dynamic braking circuit 144 responds to the 12 volt D.C. motor actuation signal by simply applying the line voltage to the motor 66. When a shut off signal is transmitted from the motor actuation circuitry 142, drive power is discontinued to the motor 66. A half-wave rectified line voltage is then applied to the motor 66 through a current limiting resistor and a free-wheeling diode is connected across the motor windings to short the back emf generated. This arrangement causes the kinetic energy associated with the distributor and the armature of the motor 66 to be dissipated as heat in the motor windings, bringing the motor 66 to a rapid stop.

The motor control board is associated with a 12 volt, 1 ampere power supply 142 operable from an external 110 or 220 volt line source. The 12 volt level is converted to 5 volts DC for purposes of operating the circuitry associated with the optical transmitters and detectors. The same 5 volt signal may be transmitted along a twin power line to the remote circuitry to provide power and a ground reference terminal for the serial data transmitted.

It should be noted that in this arrangement no AC power lines are run from the control console to the control circuitry more immediately associated with the motor 62 itself. Accordingly, only low level signals need be transmitted between the remote circuitry and the drive housing 60 with light-duty wiring. This is important in grain distributing applications where the drive mechanism and valve 10 might typically be located as much as 400 feet above ground level and it is desirable to use any conveniently available AC power source.

The operation of the valve system will be largely apparent from the foregoing description of its various components. An operator essentially selects a valve housing outlet for discharge of particular material using the selection switch 124 and then initiates rotation of the distributor 16 by means of the motor actuation switch 128. The control circuitry associated with the board 90 then applies power to the motor 62, initiating rotation of the distributor 16. When the position sensor 82 generates a unique binary signal identifying registration of the distributor outlet 24 with the selected valve housing outlet, the digital comparator 140 generates a halt signal which is relayed to the motor control board along the motor control line 130. The motor control board 144 then halts the operation of the motor 62. Particulate materials may then be loaded into the distributor inlet and discharged through the selected valve housing outlet.

The system as described is adapted to accommodate up to 63 valve housing outlets. Advantageously, the only system component which must be changed to accommodate a different number of valve outlets is the encoding plate itself. Where the valve housing outlets are equally spaced circumferentially, the encoding plate should have a number of transmission zones corresponding to the number of valve housing outlets and equally spaced circumferentially. Accordingly, in the system described, a one-to-one relationship can be maintained between the registration of each transmission zone between the transmitters and detectors and registration of the distributor with each valve housing outlet.

It will be appreciated that a particular embodiment of a particulate valve system has been described, and that modifications may be made therein embodying the various principles of operation taught in the specification without departing from the spirit of the invention or the scope of the appended claims.

I claim:

1. A valve system for distributing particulate material, comprising:
   a housing defining a plurality of outlets;
   a distributor have an inlet for receiving the particulate material and an outlet for discharging the particulate material;
   distributor mounting means for mounting the distributor to the housing such that the distributor outlet is movable into registration with any one of the plurality of housing outlets;
   drive means for moving the distributor means outlet into registration with each housing outlet in a predetermined order;

position sensing means for sensing the position of the distributor outlet relative to the housing outlets, the position sensing means including
a. transmission means for transmitting an optical signal,
b. detection means for detecting the optical signal,
c. transmission varying means for so varying the optical transmission path between the transmission means and the detection means in response to movement of the discharge outlet that the optical signal is encoded to identify registration of the distributor outlet with each of housing outlets;
selection means for permitting selection of a housing outlet with respect to which the distributor outlet is to be registered; and,
control means responsive to the selection means and to the detection means for stopping movement of the distributor under the influence of the drive means when the distributor outlet is registered with the selected housing outlet.

2. A valve system as claimed in claim 1 in which the transmission means comprise a plurality of spaced-apart optical transmitters and in which the detection means comprise a plurality of spaced-apart optical detectors, each optical detector being aligned with and responsive to a different one of the optical transmitters.

3. A valve system as claimed in claim 2 in which the transmission varying means comprise:
an encoding member positioned between the transmission means and the detection means, the encoding member having a plurality of transmission zones, each transmission zone being adapted to optically couple a unique set of the transmitters and detectors when the transmission zone registers between the transmitters and the detectors; and
mounting means mounting the encoding member for movement relative to the transmission means and the detection means such that each of the transmission zones may be registered between the transmitters and the detectors.

4. A valve system as claimed in claim 3 in which the drive means comprise:
motor means;
distributor drive train means for defining a distributor drive train coupling the distributor to the motor means;
encoder drive train means for defining an encoder drive train coupling the encoding member to the motor means such that the encoding member moves with the distributor outlet and such that a unique one of the transmission zones registers between the transmitters and detectors whenever the distributor discharge outlet registers with a particular housing outlet.

5. A valve system as claimed in claim 4 in which the drive means comprise adjustment means associated with one of the distributor drive train and the encoder drive train for permitting adjustment of the timing of the registration of the encoding zones with the transmitters and detectors relative to the registration of the distributor discharge outlet with the housing outlets.

6. A valve system as claimed in claim 5 in which the adjustment means comprise:
a first drive train member operably located in the one of the distributor drive train and the encoder drive train;
a second drive train member operably located in the one of the distributor drive train and the encoder drive train; and,
coupling means for connecting the first and second drive train members such that the second drive train member is rotated by the first drive train member, the coupling means being selectively releasable such that second drive train member can be rotated relative to the first drive train member.

7. A valve system as claimed in claim 6 in which:
the first drive train member comprises a circular track having a set of uniformly spaced-apart teeth;
the second drive train member comprises a circular track having a set of uniformly spaced-apart teeth;
the coupling means comprise a spacer normally positioned between the first and second drive train members, the spacer having a pair of opposing circular tracks each formed with uniformly spaced-apart teeth and disposed in substantially parallel relationship;
the coupling means comprise means for releasably maintaining a meshed relationship between one of the opposing circular tracks of the spacer and the circular track of the first drive train member and between the other of the opposing circuit tracks of the spacer and the circular track of the second drive train member.

8. A valve system as claimed in claim 1 in which the distributor is mounted in the interior of the housing, the valve system comprising suspension means for suspending the distributor from the housing for rotation about a predetermined axis, the suspension means comprising:
a flange attached to the distributor and having a circular peripheral edge;
a multiplicity of rollers rotatably mounted to the housing, each roller having a circular groove engaged with the peripheral edge of the flange; and,
roller mounting means for mounting one of the rollers to the housing such that the roller may be selectively displaced relative to the peripheral edge of the flange at least from a first position in which the circular groove of the one of the rollers is engaged with the peripheral edge of the flange and a second position in which the one of the roller is separated from the flange.

9. A valve system as claimed in claim 8 in which the roller mounting means comprise:
a mounting bracket supporting the one of the rollers;
an opening formed in one of the mounting bracket and the housing portion;
a slot formed in the other of the mounting bracket and the housing portion; and,
threaded fastening means extending through the opening and the slot for releasably clamping the mounting bracket to the housing;
the slot being so oriented that the fastening means may be released and the mounting bracket displaced relative to the housing thereby displacing the one of the rollers between the first and second positions.

10. A valve system as claimed in claim 8 in which:
the distributor comprises a cylindrical portion aligned with the predetermined axis, the cylindrical distributor portion having an open end defining the distributor inlet;
the housing comprises a cap removably fixed to the housing proximate to the open end of the cylindrical distributor, the cap having a cylindrical portion which seats in the open end of the cylindrical distributor portion in conforming engagement with the cylindrical distributor portion when the cap is fixed to the housing, the cylindrical cap portion being open-ended to permit introduction of the particulate material into the open end of the distributor.

11. A valve system as claimed in claim 8 in which the drive means comprise:
   motor means for producing a rotational force;
   drive train means for defining a drive train coupling the distributor to the motor means for rotation in reponse to the rotational force, the distributor drive train means including a worm wheel mounted on the exterior of the distributor, and a worm gear meshed with the worm wheel and rotated in response to the rotational force.

12. A valve system as claimed in claim 8 in which:
   the transmission means comprise a plurality of spaced-apart optical transmitters;
   the detection means comprise a plurality of spaced-apart optical detectors, each optical detector being aligned with and responsive to a different one of the optical transmitters;
   an encoding member positioned between the transmission means and the detection means, the encoding member having a plurality of transmission zones, each transmission zone being adapted to optically couple a unique set of transmitters and detectors when the transmission zone registers between the transmitters and the detectors; and,
   encoder mounting means for rotatably mounting the encoding member relative to the transmission means and the detection means such that each of the transmission zones may be registered between the transmitters and the detectors.

13. A valve system as claimed in claim 12 in which the drive means comprise:
   motor means for producing a rotational force;
   drive train means for coupling the distributor and the encoder to the motor means for rotation in response to the rotational force, the distributor drive train means including a first worm gear meshed with the worm wheel and rotated in response to the rotation force, a first worm wheel connected to the distributor for rotation therewith and meshed with the first worm gear, a second worm gear rotated in response to the rotation force, a second worm wheel connected to the encoding member for rotation therewith and meshed with the second worm wheel;
   the drive ratio between the first worm gear and the first worm wheel and the drive ratio between the second worm gear and the second worm wheel being so selected that the each transmission zone can register with the transmitters and the detectors when the distributor outlet registers with a corresponding one of the housing outlets.

14. A valve system as claimed in claim 13 in which the drive train means comprise adjustment means for permitting adjustment of the timing of the registration of the encoding zones with the transmitters and detectors relative to the registration of the distributor discharge outlet with the housing outlets.

15. A valve system as claimed in claim 14 in which the drive train means define a distributor drive train coupling the distributor to the motor means and an encoder drive train coupling the encoding member to the motor means, the adjustment means comprising:
   a first drive train member located in one of the distributor and encoder drive trains;
   a second drive train member located in one of the distributor and encoder drive trains; and,
   coupling means for connecting the first and second drive train members such that the second drive train member is rotated by the first drive train member, the coupling means being selectively releasable such that second drive train member can be rotated relative to the first drive train member.

16. A valve system as claimed in claim 15 in which:
   the first drive train member comprises a circular track having a set of uniformly spaced-apart teeth;
   the second drive train member comprises a circular track having a set of uniformly spaced-apart teeth;
   the coupling means comprise a spacer normally positioned between the first and second drive train members, the spacer having a pair of opposing circular tracks each formed with uniformly spaced-apart teeth and disposed in substantially parallel relationship;
   the coupling means comprise means for releasably maintaining a meshed relationship between one of the opposing circular tracks of the spacer and the circular track of the first drive train member and between the other of the opposing circular tracks of the spacer and the circular track of the second drive train member.

17. A valve system for distributing particulate material, comprising:
   a housing defining a plurality of outlets;
   a distributor located within the housing, the distributor having an inlet for receiving the particulate material, an outlet for discharging the particulate material and a predetermined rotational axis, the distributor having a flange with a generally circular periphery substantially centered with the rotational axis;
   distributor mounting means for mounting the distributor to the housing for rotation about the rotational axis such that the distributor outlet can be registered successively with each housing outlet, the distributor mounting means comprising a multiplicity of roller assemblies, each roller assembly having a roller and roller mounting means for mounting the roller to the housing and supporting the roller for rotation, each roller having a generally circular groove which is normally located about the flange periphery; and,
   the roller mounting means associated with at least one of the roller assemblies including means for permitting the roller associated with the at least one of the roller assemblies to be selectively displaced from a position in which the roller is located about the flange periphery and in which the roller is disengaged from the flange periphery.

18. A valve as claimed in claim 17 in which:
   the distributor comprises a cylindrical portion aligned with the rotational axis, the cylindrical distributor portion having an open end defining the distributor inlet;
   the housing comprises a cap removably fixed to the housing, the cap having a cylindrical portion which seats in the open end of the cylindrical distributor portion in conforming engagement with the cylindrical distributor portion when the cap is fixed to the housing, the cylindrical cap portion defining an internal passage which permits introduction of the particulate material into the open end of the distributor.

19. A valve as claimed in claim 17 in which:

the distributor comprises a circular gear centred for rotation about the rotational axis;
a drive shaft portion extending into the interior of the housing and mounted to the housing for rotation about the longitudinal axis of the shaft; and,
a worm gear mounted on the drive shaft portion and meshed with the circular gear.

* * * * *